(12) United States Patent  (10) Patent No.: US 7,395,797 B2
Ishimitsu et al.  (45) Date of Patent: Jul. 8, 2008

(54) PISTON FOR INTERNAL COMBUSTION ENGINE

(75) Inventors: Kengo Ishimitsu, Wako (JP); Hideharu Izumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/703,739

(22) Filed: Feb. 8, 2007

(65) Prior Publication Data

US 2007/0181089 A1 Aug. 9, 2007

(30) Foreign Application Priority Data

Feb. 9, 2006 (JP) ............................ P2006-032944

(51) Int. Cl.
*F02F 3/00* (2006.01)
*F16J 1/20* (2006.01)

(52) U.S. Cl. .................................................. 123/193.6

(58) Field of Classification Search .............. 123/193.6; 92/255, 259; 29/888.042, 888.044
See application file for complete search history.

(56) References Cited

U.S. PATENT DOCUMENTS 7,127,981 B2 * 10/2006 Endoh et al. ............. 92/165 PR
7,290,518 B2 * 11/2007 Ishimitsu et al. ......... 123/197.1
2006/0213479 A1 * 9/2006 Ishimitsu et al. ......... 123/197.4

FOREIGN PATENT DOCUMENTS

DE 003428461 A * 5/1985 .............. 123/193.6
JP 2005-133613 A 5/2005

* cited by examiner

*Primary Examiner*—M. McMahon
(74) *Attorney, Agent, or Firm*—Birch, Stewart, Kolasch & Birch, LLP

(57) ABSTRACT

A piston for an internal combustion engine includes a crown part, a land part extending from the crown part, a skirt part adjoining the land part, and a linking boss protruding from a reverse surface of the crown part and forming a spherical joint with a small end of a connecting rod. The piston is divided into an upper piston part having the land part, and a lower piston part having the skirt part and a plurality of molded plate members formed by press-molding plates.

4 Claims, 7 Drawing Sheets

PISTON FOR INTERNAL COMBUSTION ENGINE

FIELD OF THE INVENTION

The present invention relates to a piston for an internal combustion engine, which is partitioned into an upper piston part and a lower piston part.

BACKGROUND OF THE INVENTION

An example of a piston for an internal combustion engine, wherein ribs are formed radially on the reverse surface of a crown part of the piston, stresses concentrated on the crown part are alleviated, and the thickness and weight of the crown part is reduced, is proposed in Japanese Patent Laid-Open Publication No. 2005-133613. This piston for an internal combustion engine will be described based on FIG. 10 hereof.

As shown in FIG. 10, a piston 200 is molded as an integrated member having: a crown part 201; a cylindrical land part 202 that extends downward from the edge of the crown part 201; cylindrical skirt parts 203, 203 that extend further downward from the land part 202; a cup-shaped support 208 that is formed on a reverse surface 207 of the crown part 201 in order to slidably link to a small end 206 of a con rod 204; and a plurality of ribs 211 that extend downward from the reverse surface 207 of the crown part 201.

The aforementioned cup-shaped support 208 has a narrow fixed base on the side of the crown part 201 and is shaped so that the diameter gradually increases from the fixed base. Therefore, when the piston 200 is to be formed by casting, a die with a plurality of partitions is used. Productivity decreases because the partitioned die must be dismantled when removing the piston element from the partitioned die. A method of manufacture that offers better productivity than casting has been needed.

Additionally, the piston 200 needs to be made lighter in order for the internal combustion engine to achieve higher rotation speeds.

Accordingly, a need has existed for a piston for an internal combustion engine offering improved productivity and lighter weight.

SUMMARY OF THE INVENTION

According to the present invention, there is provided a piston for an internal combustion engine, which comprises: a crown part; a land part extending in a cylindrical shape from an edge of the crown part; a skirt part adjoining the land part; and a linking boss protruding from a reverse surface of the crown part and forming a spherical joint with a small end of a connecting rod, the piston being partitioned into an upper piston part having the land part, and a lower piston part having the skirt part, the lower piston part comprising a plurality of molded plate members formed by press-molding plates.

The piston for an internal combustion engine of the present invention can thereby improve the productivity of the lower piston part using a press mold. The shape of the upper piston part can be simplified, the cast can be simplified, and the piston element can be easily removed from the casting die. The productivity of the piston can also be improved thereby, and the cost of the piston can be reduced. The lower piston part, which has molded plate members, can also be made lighter.

Preferably, the piston comprises a pair of the molded plate members. Each of the molded plate members has an outer cylinder forming the skirt part; an inner cylinder positioned inside the outer cylinder so as to be attached to a cylindrical member that constitutes the spherical joint; and a round linking plate for integrally linking both the outer cylinder and inner cylinder. The pair of molded plate members is brought together and the round linking plates are joined; and the lower piston part has a box structure.

The rigidity of the lower piston part can thereby be increased and the weight can be reduced.

Desirably, the molded plate members are identical in shape.

One type of press mold is used. The tooling cost can be reduced, and the cost of the piston can be reduced.

Preferably, the round linking plate has a lightening hole with a rim which is burred.

The lightening hole enables the piston to be made lighter, and burring enables the round linking plate to be prevented from losing rigidity because of the presence of the lightening hole.

BRIEF DESCRIPTION OF THE DRAWINGS

Certain preferred embodiments of the present invention will be described in detail below, by way of example only, with reference to the accompanying drawings, in which:

FIGS. 5A through 5J are views illustrating a method for manufacturing the lower piston part, wherein FIGS. 5A, 5B are top plan views of a blank, FIG. 5C is a sectional view of a deep-drawn molded material, FIG. 5D is a view showing in section and top plan the partially molded material, FIG. 5E is a sectional view of a preliminarily molded plate member, FIG. 5F is a sectional view of an upper molded plate member, FIG. 5G is a sectional view of a plate assembly, FIG. 5H is a sectional view of joining parts before welding, FIG. 5I is a sectional view of a completed lower piston part, and FIG. 5J is a sectional view of an upright lower piston part;

DESCRIPTION OF THE PREFERRED EMBODIMENTS

Figure 1:
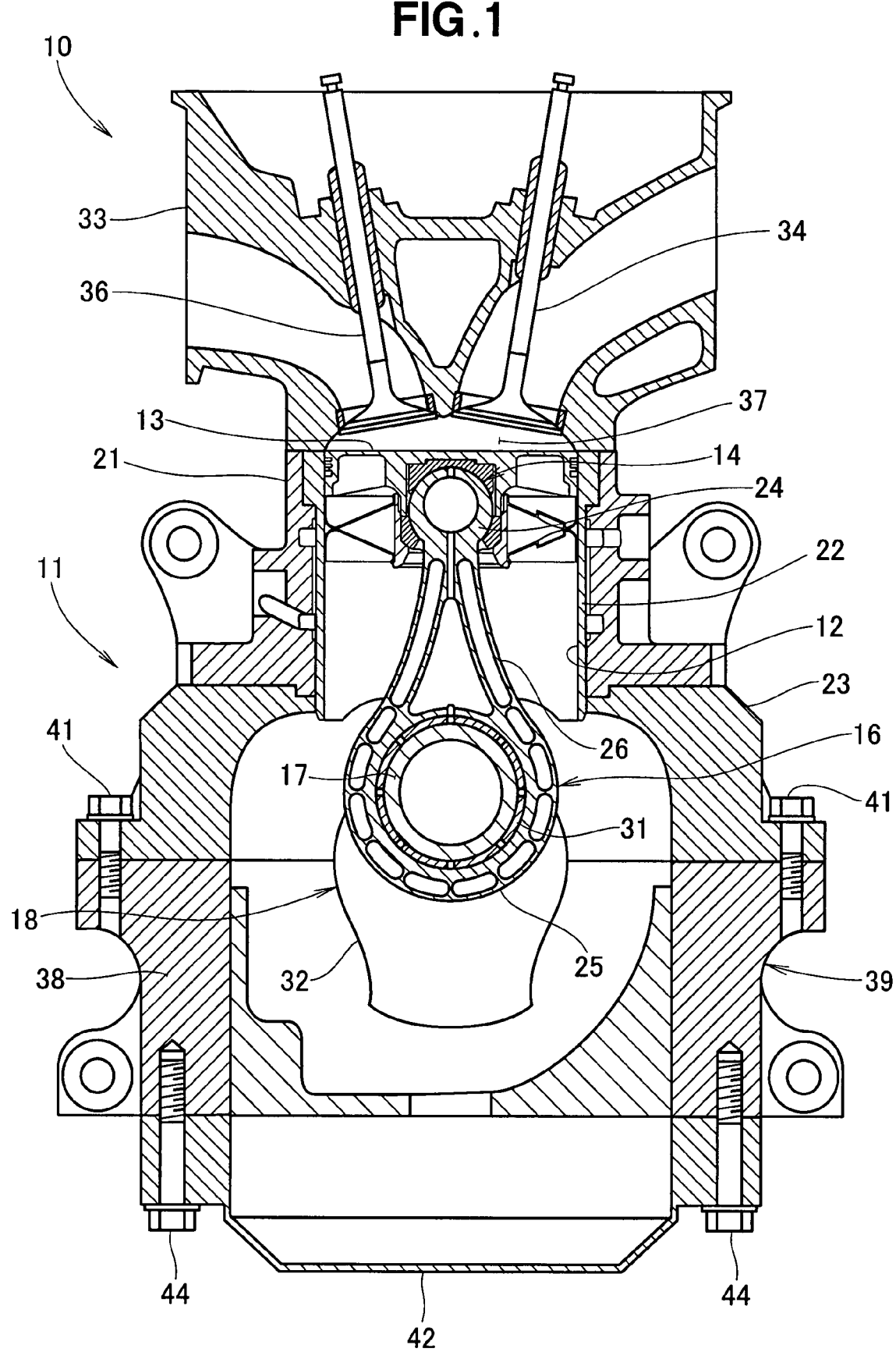
FIG. 1 is a sectional view of an internal combustion engine having a piston according to a first embodiment of the present invention.

As shown in FIG. 1, an internal combustion engine 10 has a cylinder block 11, a piston 13 that is movably inserted into a cylinder core 12 provided to the cylinder block 11, a connecting rod 16 linked to the piston 13 by a spherical joint 14, and a sectional crankshaft 18 that is rotatably attached to a lower part of the cylinder block 11 and swingably supports the connecting rod 16 with a hollow crank pin 17.

The cylinder block 11 is composed of: a cylinder 21 provided to the upper part; a cylindrical sleeve 22 fit within the cylinder 21 and forming the cylinder core 12; and an upper crankcase 23 is attached to a lower part of the cylinder 21.

The connecting rod 16 is molded as an integrated member having: a spherical small end 24 linked to the piston 13; a large end 25 linked to the crank pin 17; and a rod 26 linking the small end 24 and the large end 25. The large end 25 is linked to the crank pin 17 by a sliding bearing 31.

Reference numeral 32 designates a counterweight provided to the crankshaft 18; reference numeral 33 designates a cylinder head attached to the upper part of the cylinder block 11 by a head gasket (not shown); reference numeral 34 designates an intake valve; reference numeral 36 designates an exhaust valve; reference numeral 37 is a combustion chamber; reference numeral 38 designates a lower crankcase attached to the lower part of the upper crankcase 23 by a plurality of bolts 41 in order to form a crankcase 39 with the upper crankcase 23; and reference numeral 42 designates an oil pan attached to the lower part of the lower crankcase 38 by a plurality of bolts 44.

Figure 2:
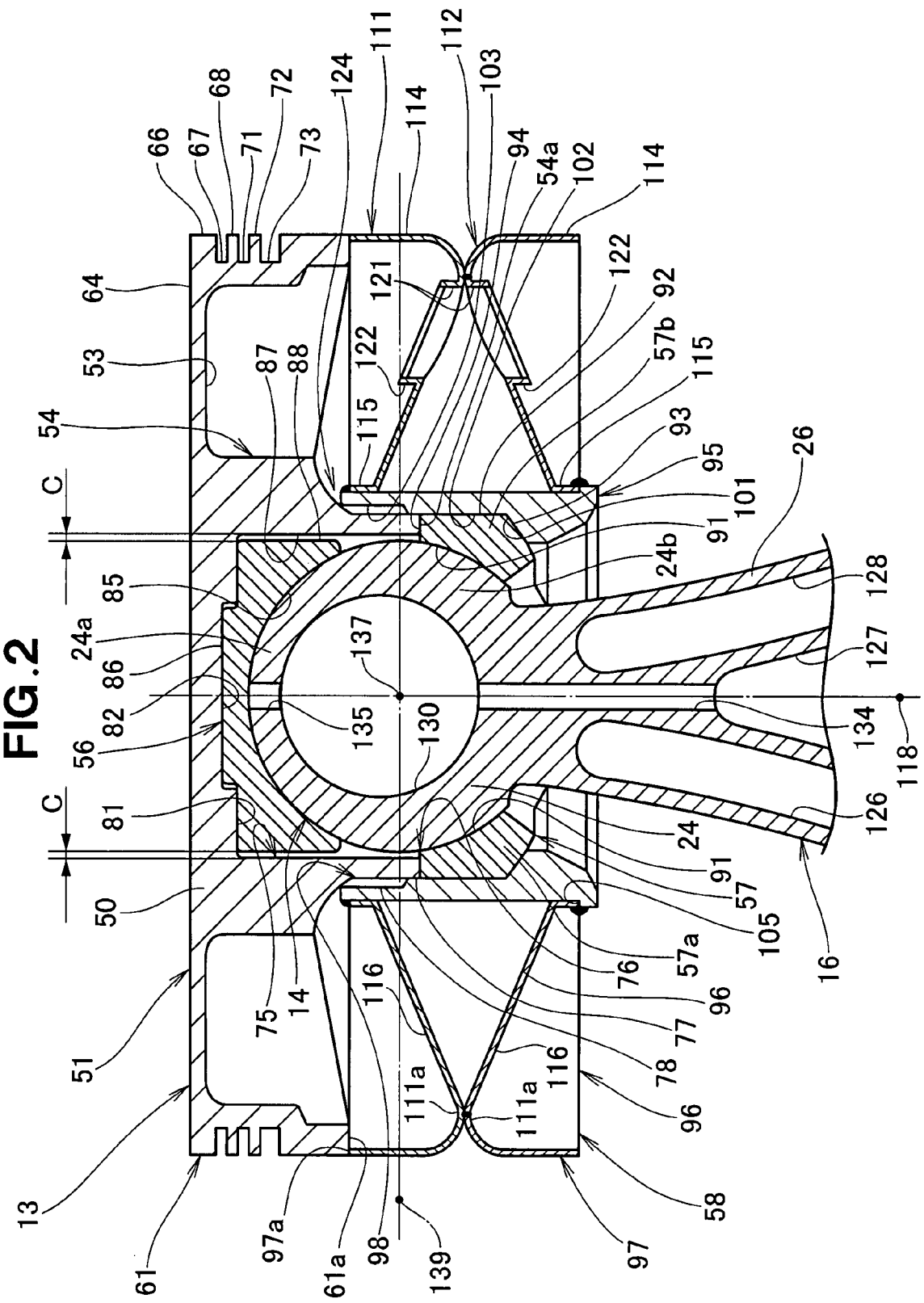
FIG. 2 is a sectional view showing the piston in conjunction with an associated connecting rod.

As shown in FIG. 2, the piston 13 comprises an upper piston part 51 that is provided with a crown part 50 that forms the combustion chamber 37 (see FIG. 1); an upper holding member 56 that slidably holds an upper hemisphere 24a of the small end 24 of the connecting rod 16 by being positioned within a protrusion 54 that protrudes from a reverse surface 53 of the crown part 50 of the upper piston part 51; a lower holding member 57 that slidably holds a lower hemisphere 24b of the small end 24 of the connecting rod 16; and a lower piston part 58 that is screwed to the upper piston part 51 in order to hold the lower holding member 57.

The upper piston part 51 is molded as an integrated member having the circular plate-shaped crown part 50, a thickened cylindrical land part 61 that extends downward from the edge of the crown part 50, and the aforedescribed protrusion 54.

The crown part 50 has a crown surface 64 that faces the combustion chamber 37 (see FIG. 1).

The land part 61 is a component having a top land 66, a top ring channel 67, a second land 68, a second ring channel 71, a third land 72, and an oil ring channel 73, in order from the side of the crown surface 64. A top ring (not shown) is fit into the top ring channel 67, a second ring (not shown) is fit into the second ring channel 71, and an oil ring (not shown) is fit into the oil ring channel 73.

The protrusion 54 has a concavity 75 for housing the upper holding member 56 in a movable manner in the radial direction of the piston 13; and a screw 78 that is formed on an outer perimeter surface 77 on the side of an opening 76 of the concavity 75. The concavity 75 is a component that forms a small concavity 82 on a bottom part 81.

The upper holding member 56 is made of a silicon nitride-type ceramic having excellent resistance to heat and wear, and is provided with a first spherical surface 85 that is a concave spherical surface fitted to the upper hemisphere 24a of the small end 24 of the connecting rod 16 in a slidable manner; and a small convexity 86 positioned within the small concavity 82 of the upper piston part 51. An inner perimeter surface 87 of the concavity 75 and an outer perimeter surface 88 of the upper holding member 56 both have a gap C on one side, and a gap C (not shown) is also present between the small concavity 82 and the small convexity 86, each on one side. The gap C is also present between the inner perimeter surface 87 of the concavity 75 and the small end 24 of the connecting rod 16, each on one side.

$Si_3N_4$ (silicon nitride), BN (boron nitride), AlN (aluminum nitride), and TiN (titanium nitride) are suitable as the aforementioned silicon nitride-type ceramic.

The lower holding member 57 is a member made of a silicon nitride-type ceramic (the materials given above are suitable), is partitioned into four parts, and is provided with a second spherical surface 91 that is a concave spherical surface fitted to the lower hemisphere 24b of the small end 24 of the connecting rod 16 in a slidable manner; an outer perimeter surface 92 and a tapered part 93 that are fitted to the lower piston part 58; and a contact surface 94 that comes into contact with an end surface 54a of the protrusion 54 of the upper piston part 51. The lower holding member 57 does not rotate relative to the protrusion 54 of the upper piston part 51 due to rotation-checking pins (not shown) and keeps the piston 13 from rotating relative to the connecting rod 16 through the provision of a guided surface that contacts the rod 26 of the connecting rod 16. 57a through 57d (57c, 57d are not shown) are the four partitions that constitute the lower holding member 57.

The lower piston part 58 is composed of: a cylinder 95 that is positioned to enclose the lower holding member 57 and the lower part of the protrusion 54 of the upper piston part 51; and a plate assembly 96 that is attached to the cylinder 95. An upper end surface 97a of a skirt part 97 that is provided to the entire perimeter of the lower piston part 58 is a member that contacts a lower end surface 61a of the land part 61 of the upper piston part 51.

In a hole 98 of the cylinder 95 are provided a female tapered part 101 that is tightly attached to the male tapered part 93 of the lower holding member 57; an inner perimeter surface 102 that is fitted to the outer perimeter surface 92 of the lower holding member 57 with a prescribed gap; and a female screw 103 that is formed on the upper part of the inner perimeter surface 102 so as to be threaded with the male screw 78 of the upper piston part 51. 105 is a step part that holds the lower internal part of the plate assembly 96 in position.

The plate assembly 96 joins together: an upper molded plate member 111 that is formed from a plate by press molding; and a lower molded plate member 112 that is formed from a plate by press molding and is attached to the lower part of the upper molded plate member 111.

The upper molded plate member 111 has the same shape as the lower molded plate member 112 and is molded as an integrated member having: an outer cylinder 114 that constitutes a part of the skirt part 97; an inner cylinder 115 that is fitted to the cylinder 95 and welded to the cylinder 95; and a tapered, round linking plate 116 that links both the outer cylinder 114 and the inner cylinder 115. 111a, 111a are joining parts that are formed on both the upper molded plate member 111 and the lower molded plate member 112 in order to join together the upper molded plate member 111 and the lower molded plate member 112.

Reference numeral 121 is a lightening hole formed in the round linking plate 116, reference numeral 122 is a flange formed by burring the rim of the lightening hole 121.

The outer cylinder 114 of the upper molded plate member 111 and the outer cylinder 114 of the lower molded plate member 112 are the components that constitute the skirt part 97.

The lower piston part 58 thus has the configuration of with a box structure due to the formation of an annular, substantially closed space having a triangular cross-section from the cylinder 95, the upper molded plate member 111, and the lower molded plate member 112. The lower piston part 58 can be lightened by decreasing the thickness of the upper molded plate member 111 and the lower molded plate member 112 and has high rigidity capable of resisting inertial force, thrust, and other forces.

The male tapered part 93 of the lower holding member 57 and the female tapered part 101 of the cylinder 95 are components capable of aligning the axis of the lower holding member 57 with the axis of the cylinder 95 by being fit together.

The aforementioned male screw 78 of the upper piston part 51 and the female screw 103 of the lower piston part 58 are the components that constitute a screw coupling 124.

The connecting rod 16 is a member that has hollow lightening sections 126, 127, 128 in the interior of the rod part 26, and has a hollow lightening section 130 in the interior of the small end 24. The connecting rod 16 has oil holes 134, 135 for feeding oil from the large end 25 (see FIG. 1) to the sliding surface of the spherical joint 14.

The aforementioned protrusion 54, upper holding member 56, lower holding member 57, cylinder 95, and small end 24 are the components that constitute the aforementioned spherical joint 14 that links the upper piston part 51 and the lower piston part 58.

Reference numeral 137 is a center point that designates the center of the spherical small end 24 and coincides with the center of gravity of the piston 13, but the center point 137 may also be made to coincide substantially with the center of gravity of the piston 13.

Reference numeral 138 is an axis of the piston 13. Reference numeral 139 is a straight line that passes through the center point 137 and is included on a plane that is orthogonal to the axis 138.

Figure 3:
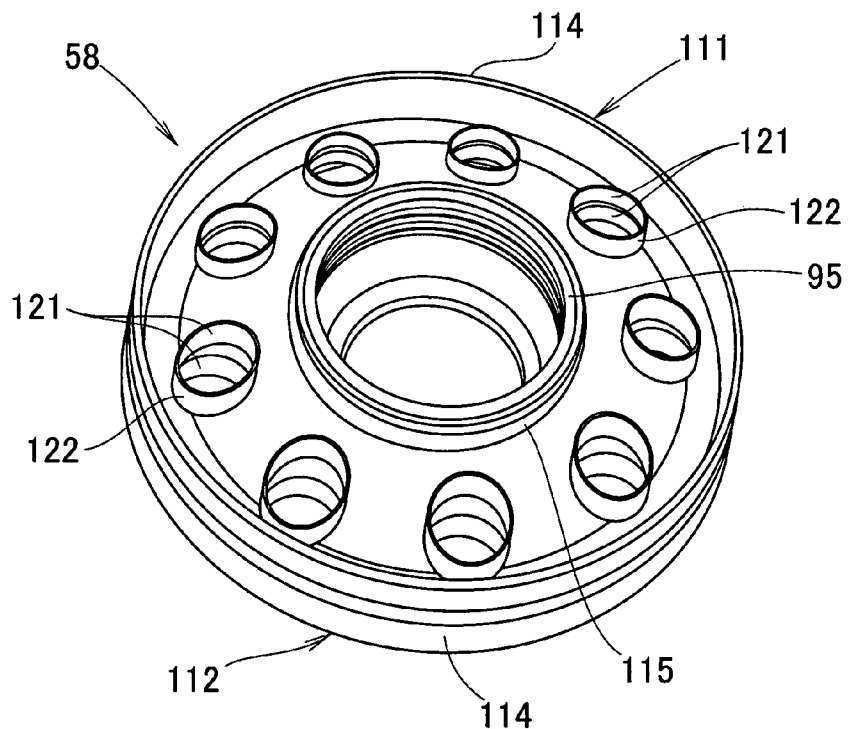
FIG. 3 is a perspective view of a lower piston part of the piston.

The press-molded upper molded plate member 111 and the lower molded plate member 112, which was also press molded, are joined together as shown in FIG. 3. The cylinder 95 is attached to the inner cylinders 115 of the upper molded plate member 111 and the lower molded plate member 112, forming the lower piston part 58 into a box shape.

The upper molded plate member 111 and the lower molded plate member 112, which were press-molded from plates, are thus included in the lower piston part 58, and the lower piston part 58 is formed into a box shape. Therefore, the upper molded plate member 111 and the lower molded plate member 112 are easily manufactured, the productivity of the lower piston part 58 can be improved and the weight can be reduced. Furthermore, the rigidity of the lower piston part 58 can be increased.

Figure 4:
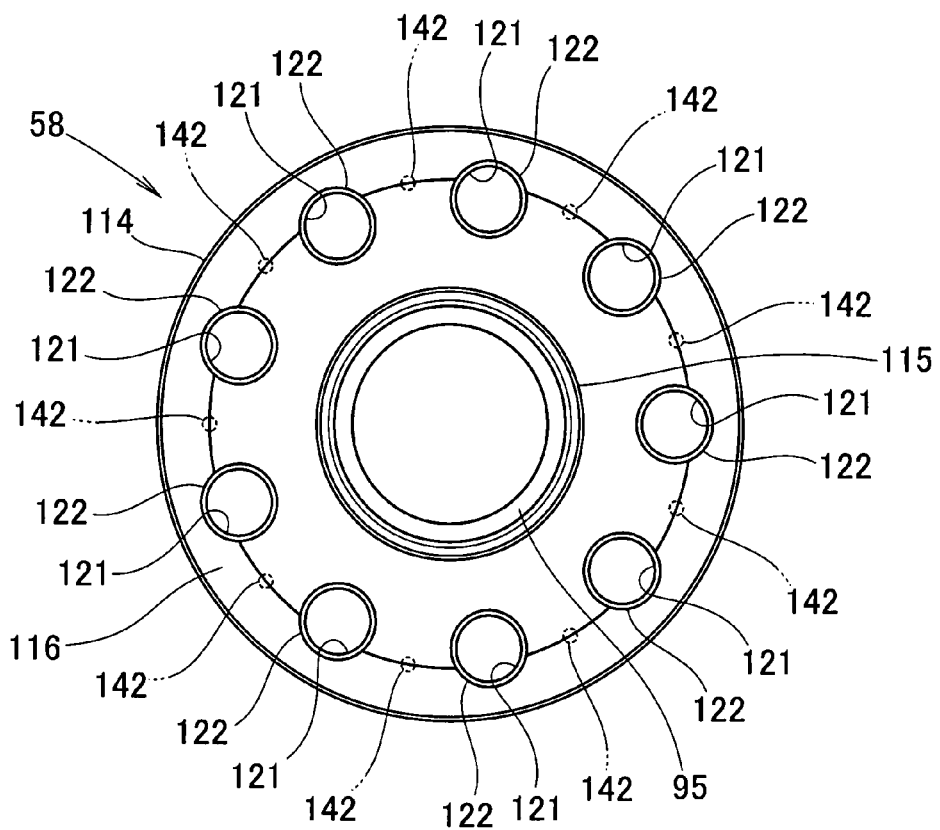
FIG. 4 is a top plan view of the lower piston part.

As shown in FIG. 4, welding points 142 (on the reverse surface) at which the two round linking plates 116 are welded together are positioned near the outer cylinder 114 of the round linking plates 116, 116 (designated by the forward 116 mark) of the lower piston part 58 and between each of the lightening holes 121, 121.

A method for manufacturing the lower piston part 58 will be described below.

Figure 5A:
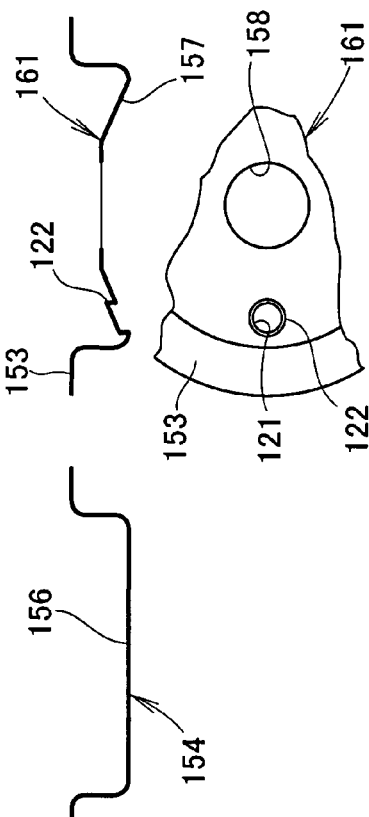

A rectangular blank 151 made of an aluminum alloy (the material is, e.g., A7N01-O, where O is a physical property classification code that designates softness) is prepared, as shown in FIG. 5A.

Figure 5B:
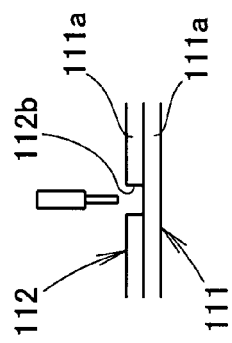

The blank 151 shown in FIG. 5A is punched out with a press, making a round plate 152 as shown in FIG. 5B.

Figure 5C:
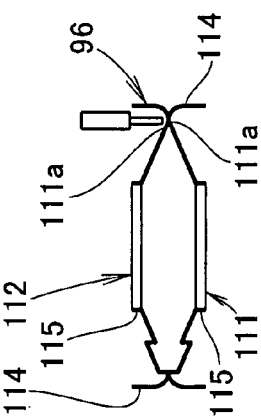

A deep-drawing process is performed on the round plate 152 shown in FIG. 5B, resulting in a deep-drawn molded material 154 with a flange 153 attached to the rim, as shown in FIG. 5C.

Figure 5D:
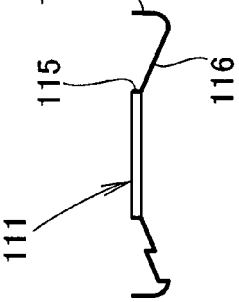

A plate-shaped part 157 is formed by press molding on a bottom 156 of the deep-drawn molded material 154 shown in FIG. 5C, and a center hole 158 is punched out. Additionally, a plurality of lightening holes 121 is punched out and the flanges 122 are formed on the rims of the lightening holes 121 by burring, resulting in a partially molded material 161, as shown in FIG. 5D.

Figure 5E:
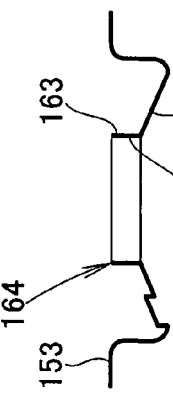

The rim of the center hole 156 is raised by press molding, resulting in a standing rim 163 of the center hole and a preliminary molded plate member 164, as shown in FIG. 5E.

Figure 5F:
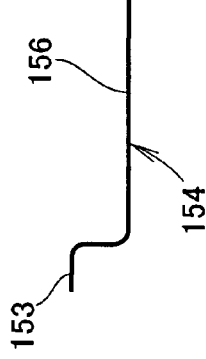

Part of the flange 153 and the standing rim 163 of the center hole of the preliminary molded plate member 164 shown in FIG. 5E are trimmed, resulting in the upper molded plate member 111, as shown in FIG. 5F. The lower molded plate member 112 (see FIG. 2) is fashioned in the same manner.

Figure 5G:
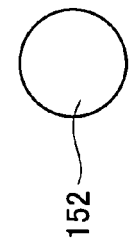

The lower molded plate member 112 is placed on the upper molded plate member 111 and held in position, and the joining parts 111a, 111a are welded and joined together by, e.g., electron-beam welding, as shown in FIG. 5G. The plate assembly 96 is thereby completed.

Figure 5H:
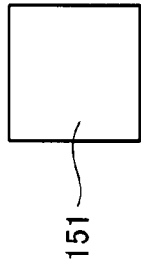

A plurality of holes 112b is opened only in the lower molded plate member 112 in order to facilitate welding, as shown in FIG. 5H. The upper molded plate member 111 and the internal surfaces of the holes 112b are then fused and joined together by electron-beam welding. Welding is performed from the side of the lower molded plate member 112 in order to minimize the effect of heat by keeping the welding points farther away from the crown part 50 (see FIG. 2), which reaches the highest temperature when the piston 13 (see FIG. 2) is in operation.

Electron-beam welding accelerates and focuses electrons using a high voltage in a vacuum, whereby the kinetic energy of the electrons is converted into thermal energy, and the materials to be welded are heated, fused, and joined together. Since the irradiated material is therefore rapidly and partially melted, little heat diffuses to the base metal and heat deformation or other effects caused by heat seldom occur.

Figure 5I:
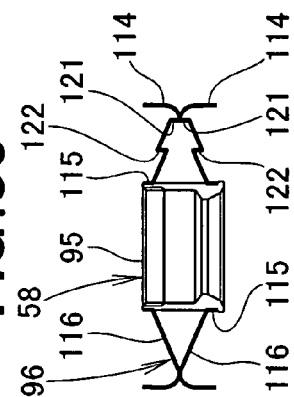

The cylinder 95 is inserted into the inner cylinders 115, 115 of the plate assembly 96, and the inner cylinders 115, 115 and the cylinder 95 are welded and joined together, as shown in FIG. 5I. The lower piston part 58 is thereby completed.

Figure 5J:
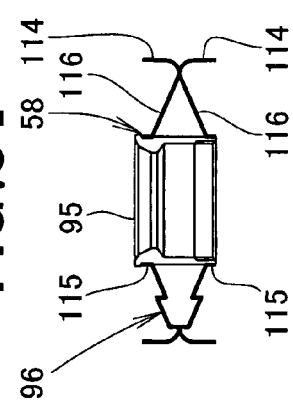

An upright lower piston part 58 is shown in FIG. 5J.

A upper molded plate member 111 and a lower molded plate member 112 having identical shapes can be rapidly manufactured by a series of steps using a press, as shown in FIGS. 5A through 5J. Productivity can be rapidly improved as compared with conventional lower piston parts manufactured by casting.

Figure 6:
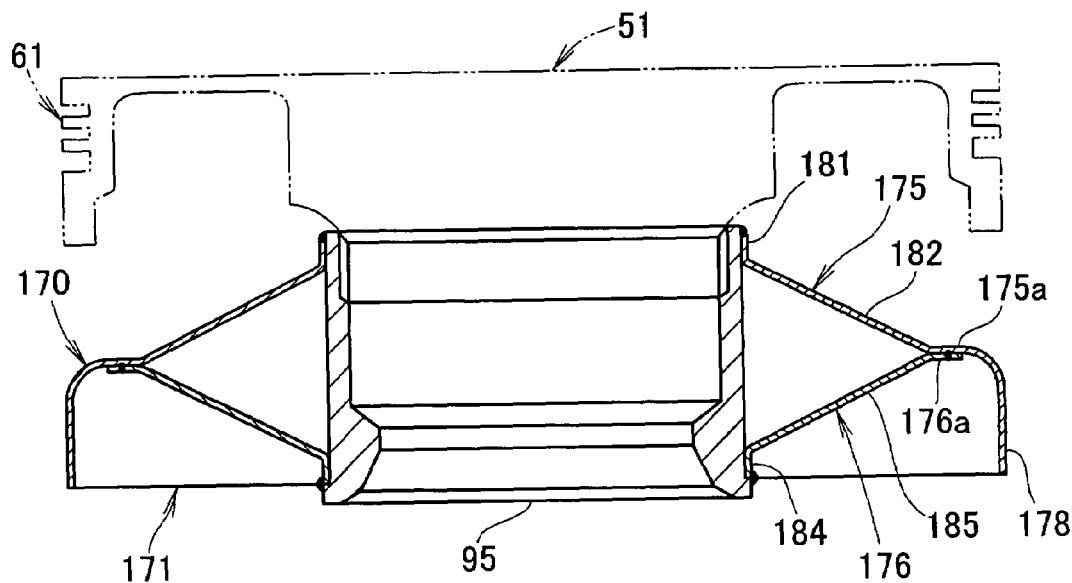
FIG. 6 is a sectional view showing a lower piston part according to a second embodiment of the present invention.

As shown in FIG. 6, a lower piston part 170 is composed of the cylinder 95 and a plate assembly 171 attached to the cylinder 95. The lower piston part 170 has a skirt part (an outer cylinder 178 described hereinafter) that is provided to the entire perimeter and is separated from the land part 61 of the upper piston part 51.

The plate assembly 171 joins an upper molded plate member 175, which was formed from a plate by press molding, and a lower molded plate member 176, which was formed from a plate by press molding.

The upper molded plate member 175 is molded as an integrated member having: the outer cylinder 178 that is the skirt part; an inner cylinder 181 that is fitted to the cylinder 95 and welded to the cylinder 95; and a tapered, round linking plate 182 that links both the outer cylinder 178 and the inner cylinder 181.

The lower molded plate member 176 is molded as an integrated member having: a joining part 176a that is joined to a joining part 175a provided to the upper molded plate member 175; an inner cylinder 184 fitted to the cylinder 95 and welded to the cylinder 95; and a tapered, round linking plate 185 that links both the joining part 176a and the inner cylinder 184.

Figure 7:
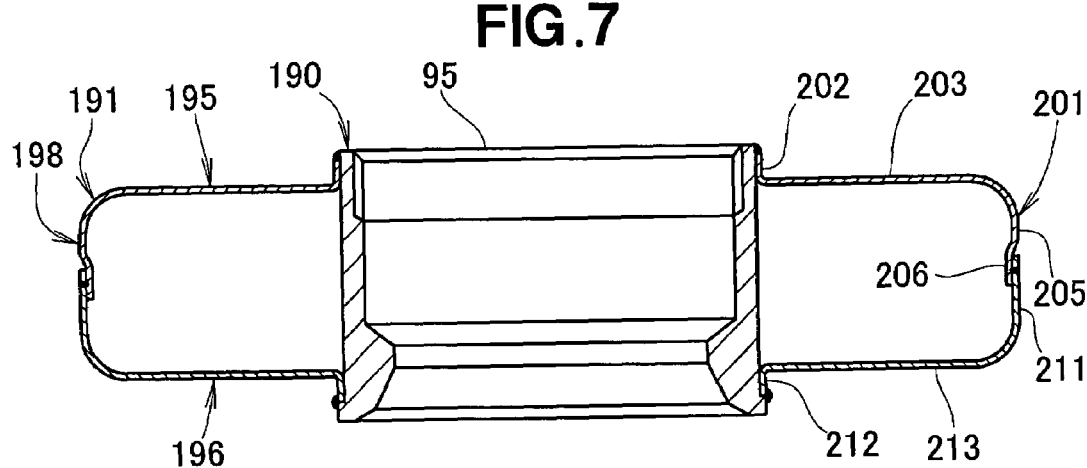
FIG. 7 is a sectional view showing a lower piston part according to a third embodiment of the present invention.

As shown in FIG. 7, a lower piston part 190 is composed of the cylinder 95 and a plate assembly 191 attached to the cylinder 95.

The plate assembly 191 joins an upper molded plate member 195, which was formed from a plate by press molding, and a lower molded plate member 196, which was formed from a plate by press molding.

The upper molded plate member 195 is molded as an integrated member having: an outer cylinder 201 constituting a part of a skirt part 198; an inner cylinder 202 fitted to the cylinder 95 and welded to the cylinder 95; and a round linking plate 203 linking both the outer cylinder 201 and the inner cylinder 202.

The outer cylinder 201 is composed of a cylindrical outer-cylinder base 205 and a small-diameter part 206 of the outer cylinder that has a smaller diameter than the outer-cylinder base 205 and is positioned concentrically with the outer-cylinder base 205.

The lower molded plate member 196 is molded as an integrated member having: an outer cylinder 211 constituting a part of the skirt part 198 and welded to the outside of the small-diameter part 206 of the outer cylinder of the upper molded plate member 195; an inner cylinder 212 fitted to the cylinder 95 and welded to the cylinder 95; and a round linking plate 213 linking both the outer cylinder 211 and the inner cylinder 212.

Figure 8:
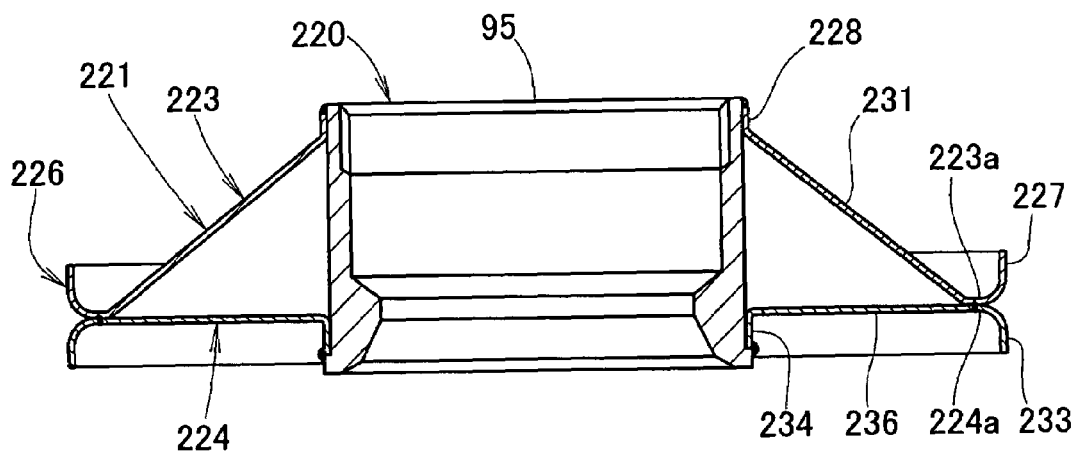
FIG. 8 is a sectional view showing a lower piston part according to a fourth embodiment of the present invention.

As shown in FIG. 8, a lower piston part 220 is composed of the cylinder 95 and a plate assembly 221 attached to the cylinder 95. The plate assembly 221 brings together and joins an upper molded plate member 223, which was formed from a plate by press molding, and a lower molded plate member 224, which was also formed from a plate by press molding.

The upper molded plate member 223 is molded as an integrated member having: an outer cylinder 227 constituting a part of a skirt part 226; an inner cylinder 228 fitted to the cylinder 95 and welded to the cylinder 95; and a tapered, round linking plate 231 linking both the outer cylinder 227 and the inner cylinder 228.

The lower molded plate member 224 is molded as an integrated member having: an outer cylinder 233 constituting a part of the skirt part 226; an inner cylinder 234 fitted and welded to the cylinder 95; and a round linking plate 236 linking both the outer cylinder 233 and the inner cylinder 234.

Reference numerals 223a, 224a in FIG. 8 are joining parts that are formed on both the upper molded plate member 223 and the lower molded plate member 224 in order to join together the upper molded plate member 223 and the lower molded plate member 224.

The outer cylinder 227 of the upper molded plate member 223 and the outer cylinder 233 of the lower molded plate member 224 are the components that constitute the skirt part 226.

Figure 9:
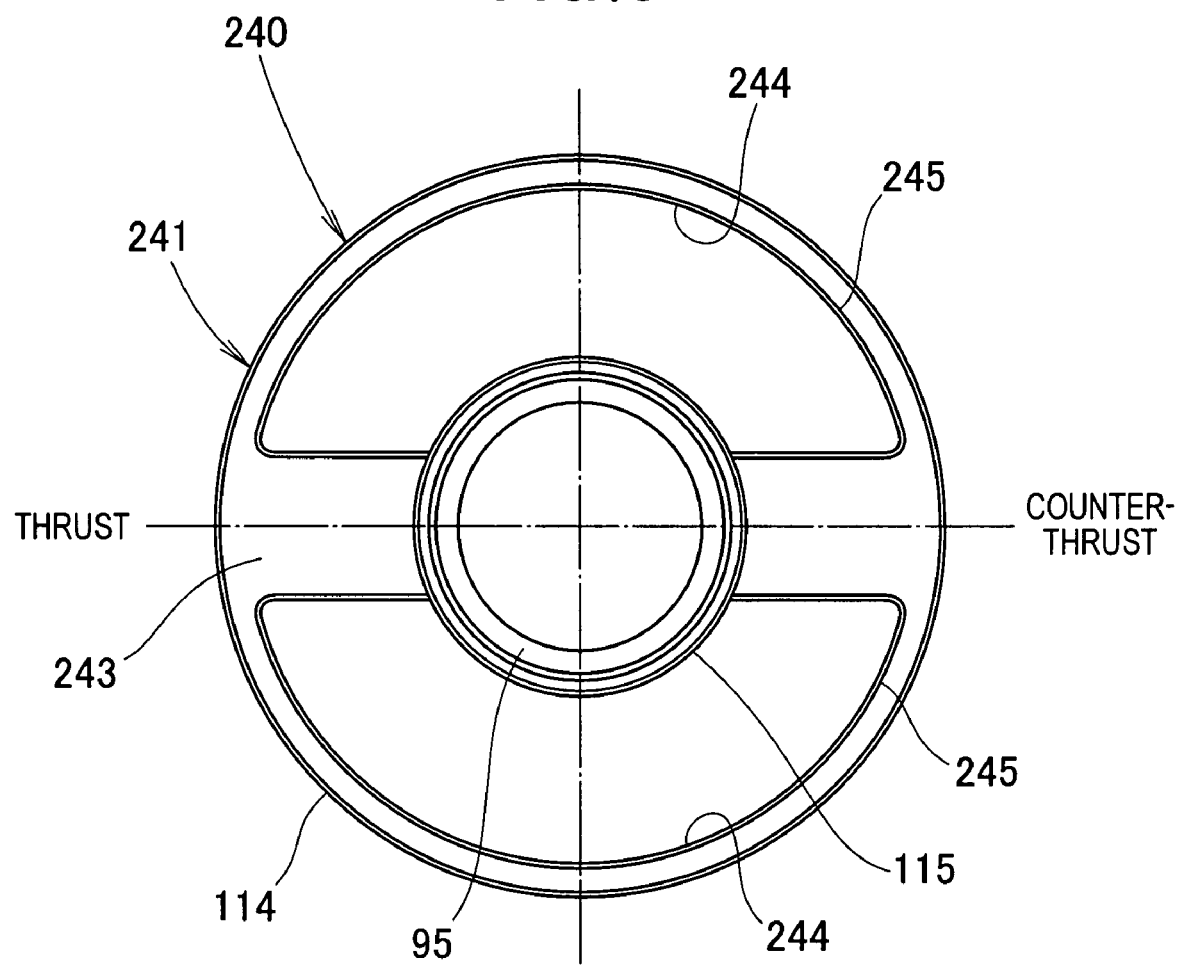
FIG. 9 is a plan view showing a lower piston part according to a fifth embodiment of the present invention.
Figure 10:
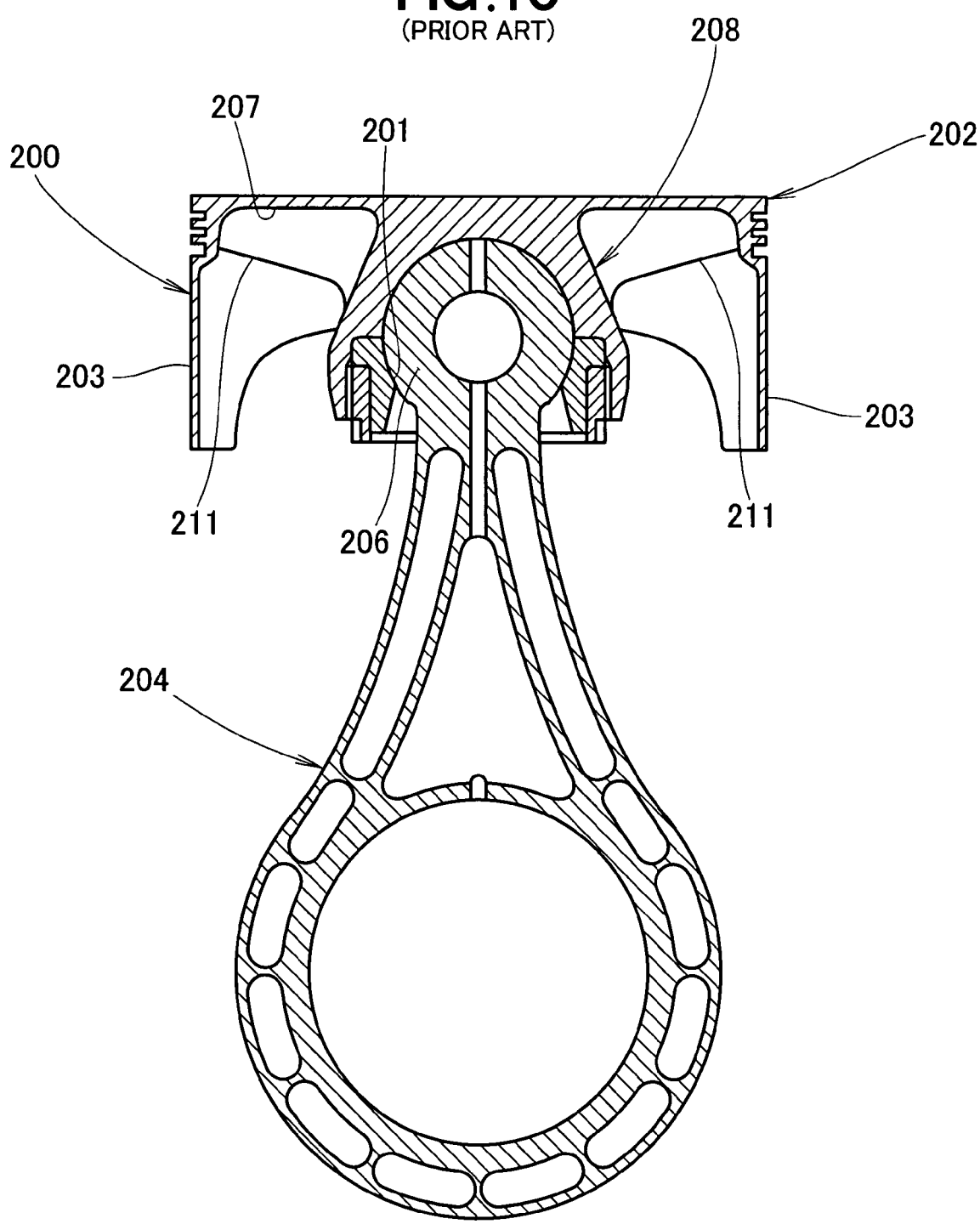
FIG. 10 is a sectional view showing a conventional piston for an internal combustion engine.

As shown in FIG. 9, lightening holes 244, 244 are formed on each round linking plate 243 of an upper molded plate member 241 and a lower molded plate member 242 (not shown) of a lower piston part 240. Flanges 245 are formed on the edges of each of these lightening holes 244.

The lightening holes 244, 244 are formed on the side perpendicular to the direction of thrust/counter-thrust of the lower piston part 240.

Having the lightening holes 244, 244 formed on the side perpendicular to the direction of thrust/counter-thrust allows the rigidity of the round linking plates 243 to be kept from decreasing along the thrust/counter-thrust direction upon which thrust acts, and the lower piston part 240 can be made lighter.

The land part 61 is provided to the upper piston part 51 in the present embodiments, as shown in FIG. 2, but a skirt part may also be provided to the lower part of the land part 61, and the amount of rigidity of this skirt part and the skirt part 97 of the lower piston part 58 may be made to be substantially continuous.

Obviously, various minor changes and modifications of the present invention are possible in light of the above teaching. It is therefore to be understood that within the scope of the appended claims the invention may be practiced otherwise than as specifically described.

What is claimed is:

1. A piston for an internal combustion engine, comprising:
   a crown part;
   a land part extending in a cylindrical shape from an edge of the crown part;
   a skirt part adjoining the land part; and
   a linking boss protruding from a reverse surface of the crown part and forming a spherical joint with a small end of a connecting rod,
   wherein the piston is partitioned into an upper piston part having the land part, and a lower piston part having the skirt part, and the lower piston part comprises a plurality of molded plate members formed by press-molding plates.

2. The piston of claim 1, wherein a pair of the molded plate members is provided, and each of the molded plate members comprises: an outer cylinder forming the skirt part; an inner cylinder positioned inside the outer cylinder so as to be attached to a cylindrical member that constitutes the spherical joint; and a round linking plate for integrally linking both the outer cylinder and the inner cylinder, and wherein the molded plate members are brought together and the round linking plates are joined, and the lower piston part has a box structure.

3. The piston of claim 1, wherein the molded plate members are of identical shape.

4. The piston of claim 2, wherein the round linking member has a lightening hole with a burred rim.

* * * * *